United States Patent
Peele et al.

[11] Patent Number: 5,986,433
[45] Date of Patent: Nov. 16, 1999

[54] MULTI-RATE CHARGER WITH AUTO RESET

[75] Inventors: James C. Peele, Raleigh; Ivan N. Wakefield, Cary, both of N.C.

[73] Assignee: Ericsson, Inc., Research Triangle Park, N.C.

[21] Appl. No.: 09/183,401

[22] Filed: Oct. 30, 1998

[51] Int. Cl.⁶ ......................... H01M 10/44; H01M 10/46
[52] U.S. Cl. ............................................................. 320/125
[58] Field of Search .................................... 320/110, 125, 320/128, 135, 137, 160

[56] References Cited

U.S. PATENT DOCUMENTS

| | | | |
|---|---|---|---|
| 5,541,489 | 7/1996 | Dunstan | 320/134 |
| 5,565,759 | 10/1996 | Dunstan | 320/135 |
| 5,572,110 | 11/1996 | Dunstan | 320/106 |

Primary Examiner—Edward H. Tso
Attorney, Agent, or Firm—Coats & Bennett, P.L.L.C.

[57] ABSTRACT

A multi-rate charging circuit includes charging electronics adapted to condition power received from a power source according to operational settings for one or more charge parameters. A plurality of user-selectable charge sets each include settings for one or more of the charge parameters and one of the charge sets is designated as the current default charge set. The charging electronics assume the settings of the default charge set upon power-up, thereafter the user may select an alternative charge set if so desired. A trigger monitor, such as a current level sensor, monitors for the occurrence of a trigger event, such as low current flow associated with the removal of a battery pack, and generates a reset signal in response thereto. The reset signal causes the charging electronics to automatically assume the settings represented by the current default charge set for its operational settings. Thus, upon the occurrence of a triggering event, the charging electronics reverts to (or continues, as appropriate) the default charge set settings. Accordingly, the charging circuit automatically charges each battery pack according to the default settings unless the governing charge set is changed by the user after that battery pack is connected to the charging electronics.

27 Claims, 2 Drawing Sheets

MULTI-RATE CHARGER WITH AUTO RESET

FIELD OF THE INVENTION

The present invention relates to the field of battery pack chargers, and more particularly to battery pack chargers with multiple charge settings.

BACKGROUND OF THE INVENTION

Most high performance portable electronic devices rely on rechargeable battery packs to supply the power required for portable operation. The variety of battery packs has increased over time and continues to grow; for instance, numerous different battery cell chemistries have been employed such as Lithium, Nickel Cadmium (NiCd), Nickel Metal Hydride (NiMH), and Alkaline. These battery cells are typically assembled into battery packs having various numbers of cells and overall capacities. Different battery pack types typically have different charge capacities and optimum charging profiles. Attempting to recharge a battery pack using a different profile may not only diminish battery life and efficiency, but may also create a hazard due to overcharging and overheating.

Several approaches have been taken to allow a single battery pack charger to be able to safely charge a variety of battery pack types. First, the battery chargers may have their charge parameters set to the lowest common denominator for all the possible battery packs that may be attached to the charger; however, this approach leads to less than optimum charging in most situations. Second, the battery chargers may be equipped with expensive control circuitry to identify the battery pack type and set the charge parameters accordingly. However, this approach does not easily allow the use multiple charge profiles for the same battery pack type, such as a fast recharge and a slow recharge. Third, some battery chargers are equipped with a manual switch that a user can use to select the appropriate charge settings. However, these manual switches remain in the selected position until changed by the user; this may lead to unsafe charging when the user forgets to change the selection when changing battery pack types.

Thus, none of the prior art approaches have proven completely satisfactory and there remains a need for a battery charger which can provide multiple types of charges in a safe manner.

SUMMARY OF THE INVENTION

The charging circuit of the present invention includes charging electronics adapted to condition power received from a power source according to operational settings for one or more charge parameters. A plurality of charge sets each include settings for one or more of the charge parameters and one of the charge sets is designated as the current default charge set. The charging electronics assume the settings of the default charge set upon power-up, and the user is thereafter preferably able to select an alternative charger set, if desired. A trigger monitor monitors for the occurrence of a trigger event and generates a reset signal in response thereto. The triggering event may be when a current, voltage, or temperature associated with the charging electronics or the associated battery pack either falls outside a predetermined range or experiences a change in value of more than a predetermined amount. The reset signal causes the charging electronics to automatically assume the settings represented by the current default charge set for its operational settings. Thus, upon the occurrence of a triggering event, the charging electronics revert to the current default charge set settings.

Preferably, the trigger monitor is a simple current level sensor and the triggering event is the dropping of current flow through the charging electronics below a predetermined threshold, such as 100 mA. It is anticipated that such a current drop would occur upon removal of the battery pack from contact with the charging circuit or upon assumption of a trickle charge condition. For such an arrangement, the charging electronics would assume the default operational settings upon power up of the charging device and upon generation of the reset signal by the trigger monitor. Accordingly, the charging circuit should automatically charge each battery pack according to this default setting unless the governing charge set is changed by the user after that battery pack is connected to the charging electronics. Thus, if the default charge set allows for optimum slow charging, the user would have to manually intervene to change the charging circuit to another charge set, thereby lessening the chance that overcharging will occur inadvertently.

In some embodiments, the charging circuit also includes a controller for controlling the overall operation of the charging circuit, memory for storing a plurality of charge sets, and a selector for selection of an active charge set by a user. After selection by a user, the charging electronics assume the settings represented by the active charge set for its operational settings until either later changed by a user or until generation of the reset signal.

Further, the charging electronics may optionally include a battery pack type detector for automatically sensing the type of battery pack connected to the charging electronics. Based on the battery pack type sensed, the charge set designated as the default charge set may automatically change and/or one or more charge sets may be disabled so that only charge sets appropriate for the type of battery pack detected are available to the user to select from.

The present invention provides a method and apparatus for automatically re-setting a multi-rate charging circuit to default charge values when a trigger event is detected. Preferably, the triggering event is associated with the removal of a battery pack from contact with the charging circuit or the changing of the charge to a trickle charge. Use of the present invention should help insure that charging is automatically done according to the default charge settings whenever a battery pack is attached to the charging circuit, unless the default is changed by a user.

DETAILED DESCRIPTION

The charging circuit 20 of the present invention will be described in the context of a stand-alone battery pack recharger 10 for a wireless communications device, such as a cellular phone, that is plugged into a common wall outlet. However, it is to be understood that the present invention is not limited to such an embodiment. For instance, the recharger 10 may be powered from some other power source, such as a vehicle cigarette lighter outlet. Further, the charging circuit 20 may form a portion of a different electronic device, such as part of a hands-free speakerphone cradle, or the wireless communications device itself, or a personal computer, or desk charger, or the like.

Figure 1:
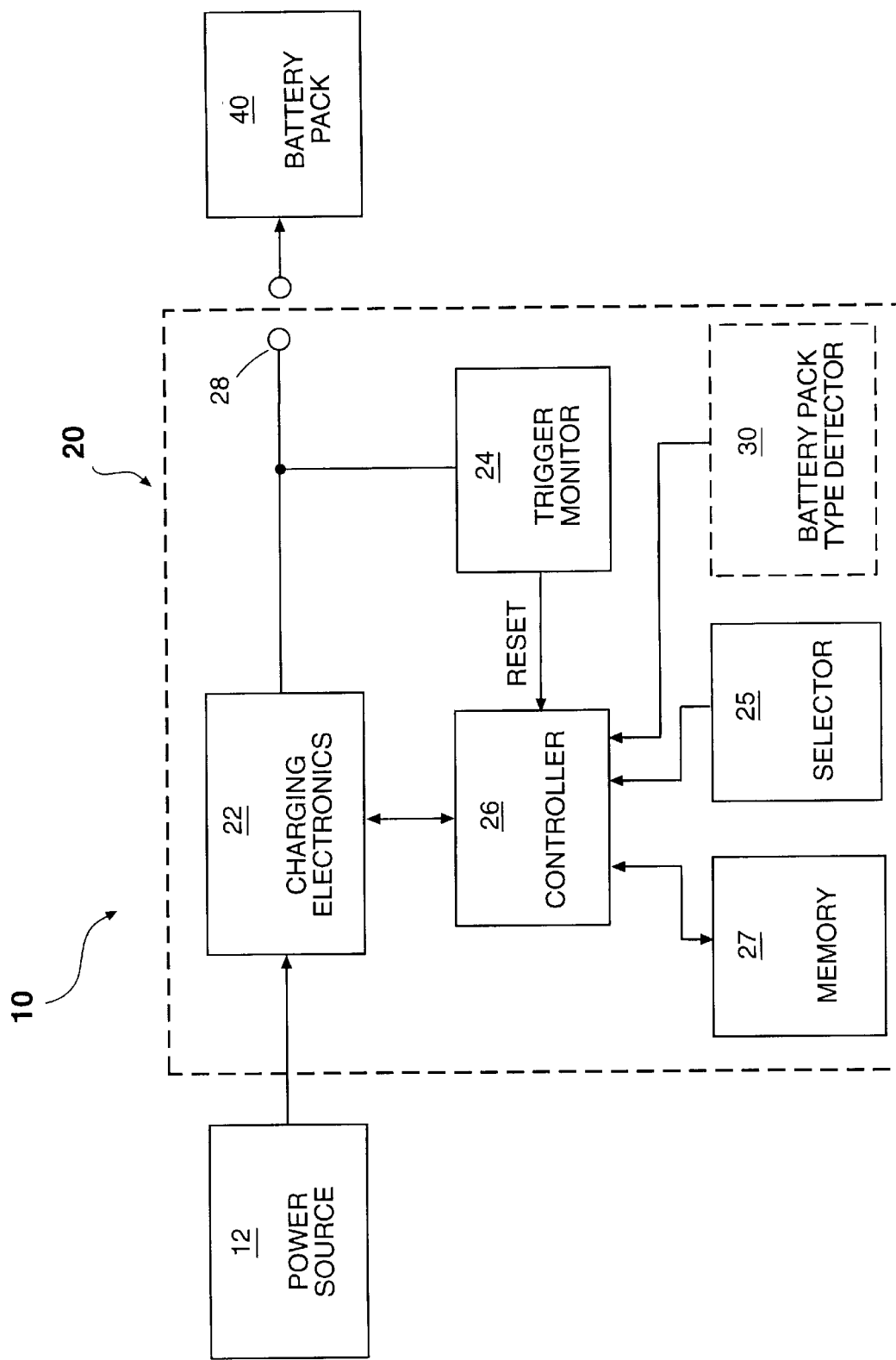
FIG. 1 is a block diagram of a charging device having a charging circuit according to the present invention.

The charging circuit 20 includes charging electronics 22, a trigger monitor 24, a selector 25, a controller 26, memory 27, and an outlet 28. One embodiment of the charging circuit 20 is represented in FIG. 1. The charging electronics 22 receive power from a power source 12 and deliver conditioned power to the outlet 28. The conditioning applied to the power is done according to the operational settings for one or more charge parameters. Examples of the charge parameters include maximum charge current, maximum allowed temperature, charge voltage, charge time, charging voltage profile, charging current profile, or charging temperature profile. For clarity, the present invention will be discussed with the assumption that the charging electronics 22 allows variation of only one charging parameter, maximum charge current, before expanding the discussion to other charging parameters. The particular details of the configuration and operation of such charging electronics 22, and variations thereof, are well known in the art and are not discussed further herein except as to assist in understanding the present invention.

Associated with the charging electronics 22 is a controller 26 for controlling the overall operation of the charging circuit 20; the controller 26 may be integral with the charging electronics 22 or separate therefrom. The controller 26 is in communication with memory 27 which stores and recalls of sets of charging parameter settings, called charge sets. Such memory 27 may be conventional ROM, RAM, a portion of processor memory, discrete logic, a software look-up table, or any functional equivalent. The memory 27 is in communication with the controller 26 so that the controller 26 may recall the charging parameter settings associated with a given charge set upon demand.

A trigger monitor 24 communicates with the controller 26 and monitors for the occurrence of a triggering event. The trigger monitor 24 may be discrete from the controller 24, a portion of the controller 24, or a portion of the combined controller 24 and charging electronics 22. The triggering event may be any suitable event which indicates the separation of the battery pack 40 from the charging circuit 20 or the completion of a charge. For instance, the triggering event may be the dropping of current flow through the charging electronics 22 below a predetermined threshold, such as would occur upon removal of the battery pack 40 from contact with the charging circuit 20 or upon assumption of a trickle charge condition, or the triggering event may be the detection of a minus delta V signal, indicating that the battery pack 40 was substantially fully charged. In general, the triggering event will be when a current, voltage, or temperature associated with the charging electronics 22 or the battery pack 40 either exceeds a predetermined level, falls below a predetermined level, or experiences a change in value of more than a predetermined amount. For this illustrative example, the triggering event will be assumed to be dropping of the current flow through the charging electronics 22 below a threshold level, such as 100 mA. Thus, for this illustrative example, the triggering monitor 24 would be a simple current level sensor which monitors the current flow between the charging electronics 22 and the outlet 28. When the current level sensor 24 detects a low current condition, the current level sensor 24 generates a reset signal.

The controller 26 responds to the reset signal by causing the operating settings of charging electronics 22 to assume the values represented by the default charge set. The default charge set is one of the plurality of charge sets which has been designated as the default. This designation may be done by the manufacturer of the charging device 10 and/or optionally may be set by the user. For this illustrative example, the default charge set would include a value for the maximum charge current that should be the default maximum charge current allowed for the charging electronics 22. The charging electronics 22 assumes this default operational setting upon power up of the charging device 10 and upon receipt of the reset signal by the controller 26. Accordingly, the charging circuit 20 will charge each battery pack 40 according to this default setting unless the setting is changed by the user after the battery pack 40 is connected to the charging electronics 22. Thus, if the default setting allows for optimum slow charging, the user would have to manually force the charging circuit 20 to another setting, thereby lessening the chance that overcharging will occur inadvertently.

Figure 2:
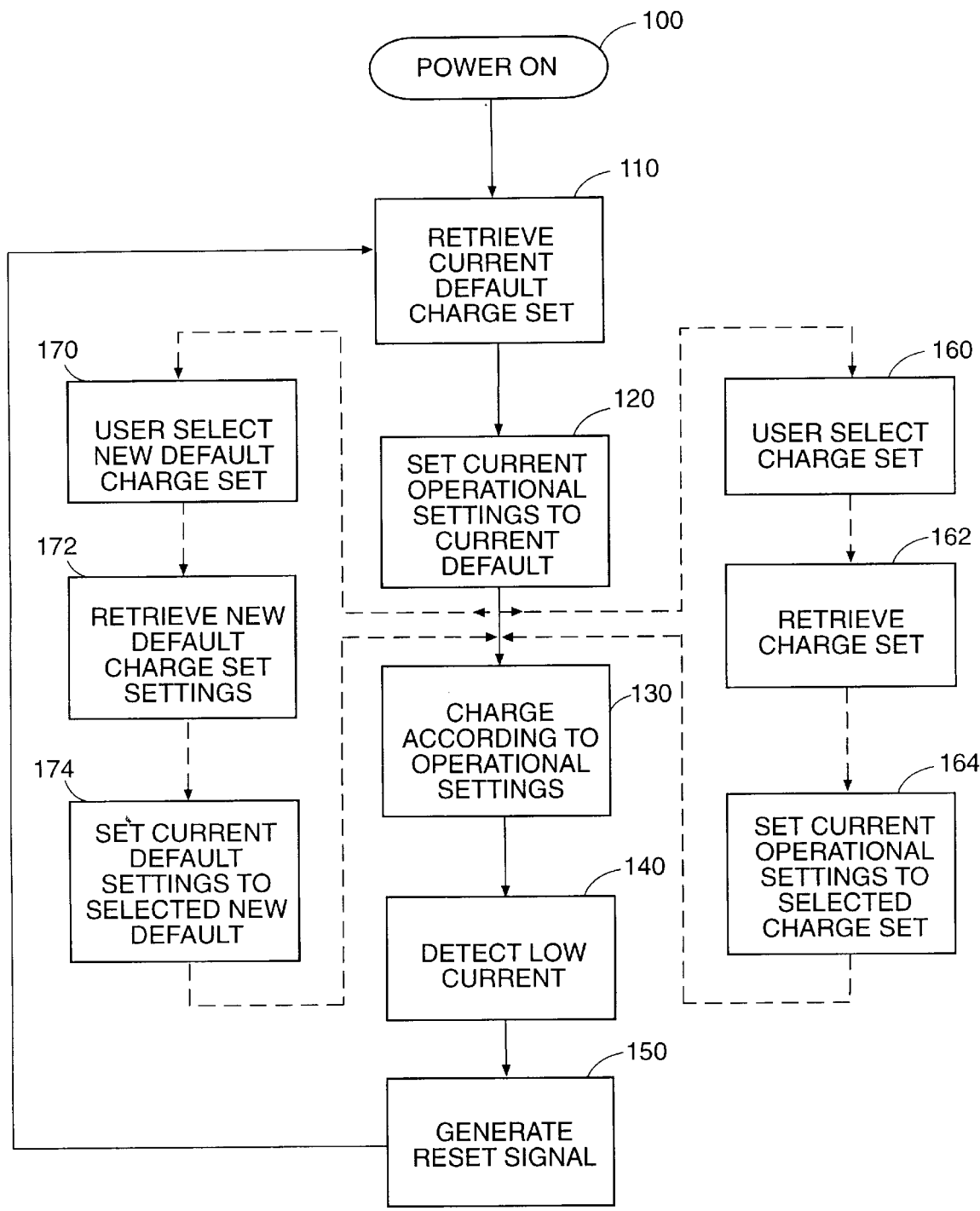
FIG. 2 is a simplified flow diagram of a charging process according to the present invention.

With reference to FIG. 2, the process flow for operation of the charging circuit 20 begins with the charging circuit 20 being powered on (box 100). Thereafter, the current default charge set is retrieved (box 110) and the operational settings of the charging electronics 22 are set to the values represented in the current default charging set (box 120).

It is anticipated that the charging electronics 22 will then immediately start charging an attached battery pack 40 (box 130); however, this is not necessary and the charging electronics 22 may instead enter a standby mode or the user may intervene to make changes to the settings. For instance, the user may use a selector 25, such as a button, switch, or the like, to select a new charge set for use in charging the battery pack 40 (boxes 160–164). Once selected (box 160), the values of the new charge set are retrieved by the controller 26 from the memory 27 (box 162) and the operational settings of the charging electronics 22 are changed to reflect the values in the newly selected charge set (box 164). Thereafter, the charging electronics 22 begins charging according to the then-current operational settings (box 130). For purposes of illustration, the default charge set may have the maximum charge current charging parameter of 50 mA, as would be appropriate for a slow charge of a NiMH battery, but the user-selected charge set may have the maximum charge current charging parameter of 700 mA, as would be appropriate for a fast charge.

During the charging process, the trigger monitor 24 is monitoring for a triggering event (box 140). For this illustrative example, the low current detector 24 is checking for a low current condition. When low current is detected, the low current detector 24 generates a reset signal (box 150). The controller 26 receives this reset signal and responds by proceeding to retrieve the current default charge set settings (box 110) and altering the operational settings of the charging electronics 22 accordingly (box 120). Thus, upon the triggering event, the charging electronics 22 reverts to (or continues, as appropriate) the current default charge set settings.

In some embodiments, the user is allowed to change the designation of the default charge set. This process is shown in FIG. 2 by the loop (boxes 170–174). A separate selector may be used for this function, or the same selector 25 may be used with a different command entry sequence such as pressing and holding the selector 25 for a period of time. A wide variety of selection interfaces are known in the art, and any method that can distinguish between the two types of entries would be sufficient. The user would select the new default charge set (box 170), via any known technique, and the setting of the new default charge set would be retrieved (box 172). Thereafter, the current default settings would be set to correspond to those of the new default charge set (box 174). Alternatively, a simple pointer to the default charge could be changed to point to the location of the newly-selected default charge set in memory 27. The charging process would then return to the main process loop (boxes 110–150).

It should be noted that both the selection of a new charge set (box 160) and the selection of a new default charge set (box 170) are shown as occurring prior to the charging of the battery pack 40 (box 130). However, these selections can likewise be made after some of the charging has occurred and/or between charges without deviating from the scope of the present invention.

It is preferred that there be some form of feedback to the user to indicate what selections (default designation and/or active charge set) have been made. For instance, an array of indicator lamps or a small display may be used. Further, as will be appreciated by those of skill in the art, it is not necessary that discrete memory 27 be employed to store the settings associated with each charge set. Instead, the plurality of charge sets may be selected and "stored" via a hardwire configuration which may include the selector 25 switch or any other method known in the art. It is only necessary that the controller 26 be able to reference the various settings associated with the charge sets so as to be able to cause the charging electronics 22 to assume the default values for operational settings when appropriate.

In some embodiments, the charging circuit 20 may include a means 30 for identifying the battery pack type of the attached battery pack 40. This battery pack identifier 30 may be of any type known in the art, such as mechanical keying, magnetic coding, electronic identification signals, or the like. For discussion of some possible battery pack type identification approaches, see for instance U.S. Pat. Nos. 5,164,652 and 5,237,257. Based on the identity of the battery pack type, one or more of the otherwise available charging sets may disabled and the designation of which charging set is the default charging set may be automatically changed. For instance, the battery pack identifier 30 may communicate with the memory 27 or controller 26 when a new battery pack type is detected. Thereafter, one or more of the charging sets may be marked as unsuitable for the battery pack type detected and therefore disabled. Also, the designation of the default charge set may change to some particular predetermined charge set appropriate for the battery pack type identified. Thus, the universe of charge sets available for selection/designation may be automatically changed based on the battery pack type identified.

The discussion above has assumed that the charging electronics 22 alter the power received from the power source 12 according the active charge set. However, under this invention, it is not necessary that the charging electronics 22 actually alter the power flowing therethrough. For instance, the power source 12 may be a transformer connected to a common wall outlet and the charging electronics 22 may simply be an on/off switch. The transformer would supply power to the charging electronics 22. The on/off type charging electronics 22 would then pass that power onto the outlet 28 until instructed to switch off by the controller 26. Thus, the charging electronics 22 and the controller 26 would together monitor the power from the power source 12 and the power flowing to the outlet 28 for compliance with the operational settings of the current charge set, but without altering the power other than by enabling or disabling the power flow. In essence, the operational settings for the charging electronics would then be the allowed operational limits for the various charge parameters. The term "conditioning" as applied to the charging electronics 22, or to the charging circuit 20 as a whole, is intended to encompass this and similar arrangements where the charging electronics 22 do not alter the power, but instead selectively allow the power to pass therethrough.

The discussion above has used charging electronics 22 and charge sets having settings for only one charge parameter, maximum charge current, as an illustrative example. However, it is to be understood that the charging electronics 22 preferably allow a plurality of variable charge parameters to be used and that the charge sets contain corresponding settings for alternative charge parameters and/or additional charge parameters. Thus, each charge set need only contain settings for one or more charge parameters. Further, it is not necessary that each charge set contain settings for the same group of charge parameters, but some uniformity may be helpful in reducing the complexity of the associated circuitry.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A charging circuit for receiving power from a power source and outputting conditioned power at an output, comprising:

a) charging electronics adapted to condition power received from the power source for delivery to the output according to operational settings for one or more charge parameters;

b) a plurality of charge sets each including settings for one or more charge parameters; one of said charge sets being designated as the current default charge set; and c) a controller in communication with said charging electronics; said controller causing said charging electronics to automatically assume the settings represented by said current default charge set for its operational settings in response to the occurrence of a trigger event.

2. The charging circuit of claim 1 wherein said controller includes a trigger monitor; said trigger monitor checking for the occurrence of said trigger event.

3. The charging circuit of claim 1 further including a trigger monitor in communication with said controller; said trigger monitor checking for the occurrence of said trigger event and generating a reset signal in response thereto.

4. The charging circuit of claim 3 wherein said trigger monitor generates a reset signal in response to the occurrence of said trigger event.

5. The charging circuit of claim 1 further including a selector for selection of an active charge set by a user; wherein said charging electronics assume the settings represented by said active charge set for its operational settings until either changed by a user or until the occurrence of said trigger event.

6. The charging circuit of claim 1 wherein said charge parameters relate to one or more of the following: maximum charge current, maximum allowed temperature, charge voltage, charge time, charging voltage profile, charging current profile, or charging temperature profile.

7. The charging circuit of claim 1 further including a battery pack removably coupled to said outlet.

8. The charging circuit of claim 1 further including a selector for changing the designation of which of said charge sets is said current default charge set.

9. The charging circuit of claim 1 further including a selector for selection of said charge set by a user, and wherein the said selector both selects which of said charge sets to use for said operational settings for said charging electronics and changes the designation of which of said charge sets is said current default charge set.

10. The charging circuit of claim 1 further including memory for storing said charge sets.

11. The charging circuit of claim 1 further including a battery pack removably coupled to said outlet, wherein said battery pack is one of a plurality of types, and further including a battery pack type detector in communication with said charge electronics, wherein said operational settings depend on the battery pack type detected by said battery pack type detector.

12. The charging circuit of claim 3 wherein said trigger monitor is a current level sensor and wherein said trigger event is a current flow through said charging electronics of less than a predetermined level.

13. The charging circuit of claim 12 wherein the predetermined level is a trickle charge level.

14. The charging circuit of claim 4 wherein said controller is disposed between said charging electronics and said trigger monitor and wherein said controller is operative to control the operation of said charging electronics and to receive said reset signal.

15. The charging circuit of claim 1 further including:
   a) a plurality of classes, each class including one or more charge sets, wherein a charge set may belong to more than one class;
   b) a battery pack removably coupled to said outlet, wherein said battery pack is one of a plurality of types;
   c) a battery pack type detector in communication with said charge electronics, wherein said classes are selectively disallowed depending on the battery pack type detected by said battery pack detector; and
   d) wherein operational settings are set according to a non-disallowed charge set.

16. A charging circuit for receiving power from a power source and outputting conditioned power at an output, comprising:
   a) charging electronics adapted to condition power received from the power source for delivery to the output according to operational settings for one or more charge parameters;
   b) a plurality of selectable charge sets each including settings for one or more charge parameters; one of said charge sets being designated as the current default charge set;
   c) a trigger monitor in communication with said charging electronics; said trigger monitor checking for the occurrence of a trigger event and generating a reset signal in response thereto; wherein said trigger monitor is a current level sensor and wherein said trigger event is a current flow through said charging electronics of less than a predetermined level;
   d) a controller disposed between said charging electronics and said trigger monitor; said controller operative to control the operation of said charging electronics and to receive said reset signal;
   e) a first selector for selection of an active charge set by a user and in communication with said controller; wherein said charging electronics assume the settings represented by said active charge set for its operational settings until either changed by a user or until generation of said reset signal; and
   f) wherein said charging electronics automatically assumes the settings represented by said current default charge set for its operational settings in response to said reset signal.

17. The charging circuit of claim 16 further including:
   a) a plurality of classes, each class including one or more charge sets, wherein a charge set may belong to more than one class;
   b) a battery pack removably coupled to said outlet, wherein said battery pack is one of a plurality of types;
   c) a battery pack type detector in communication with said charge electronics, wherein said classes are selectively disallowed depending on the battery pack type detected by said battery pack detector; and
   d) wherein operational settings are set according to a non-disallowed charge set.

18. A method of controlling a charging circuit for a battery pack, the charging circuit including charging electronics operative to charge a battery pack according to one or more charge parameters, comprising:
   a) establishing a plurality of charge sets; said charge sets including settings for one or more charge parameters;
   b) designating a charge set as the current default charge set; and
   c) monitoring the charging electronics for a triggering event; and
   d) automatically assuming, by said charging electronics, the settings represented by said current default charge set for operational settings in response to said triggering event.

19. The method of claim 18 further including generating a reset signal in response to said triggering event and wherein said automatically assuming the settings represented by said current default charge set for operational settings is in response to said reset signal.

20. The method of claim 18 wherein said triggering event is when the current flow through the charging circuit drops below a predetermined level.

21. The method of claim 20 wherein the predetermined level is a trickle charge level.

22. The method of claim 18 further including, after said establishing, selecting one of said charge sets as the current charge set and operating the charging electronics according to the current charge set before said assuming the settings represented by said current default charge set for operational settings in response to said triggering event.

23. The method of claim 18 wherein said charge parameters relate to one or more of the following: maximum charge current, maximum allowed temperature, charge voltage, charge time, charging voltage profile, charging current profile, or charging temperature profile.

24. The method of claim 18 further including charging the battery pack according to the current operational settings.

25. The method of claim 18 wherein the battery pack is removably coupled to the charging electronics and wherein said battery pack is one of a plurality of types, and further including:
   a) charging the battery pack
   b) detecting the battery pack type of the battery pack before said charging;
   c) wherein said operational settings depend on the battery pack type detected by said battery pack type detector.

26. The method of claim 18 further including changing the designation of which of said charge sets is said current default charge set.

27. The method of claim 26 wherein a user changes the designation of which of said charge sets is said current default charge set via a selector.

* * * * *